(12) United States Patent
Okada

(10) Patent No.: US 11,289,101 B2
(45) Date of Patent: Mar. 29, 2022

(54) VEHICLE AUTHENTICATION DEVICE AND VEHICLE CONTROL SYSTEM

(71) Applicant: TOYOTA JIDOSHA KABUSHIKI KAISHA, Toyota (JP)

(72) Inventor: Hiroki Okada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 243 days.

(21) Appl. No.: 16/432,349

(22) Filed: Jun. 5, 2019

(65) Prior Publication Data

US 2019/0385618 A1 Dec. 19, 2019

(30) Foreign Application Priority Data

Jun. 15, 2018 (JP) .............................. JP2018-114274

(51) Int. Cl.
*G10L 17/24* (2013.01)
*B60R 25/25* (2013.01)
*B60K 35/00* (2006.01)

(52) U.S. Cl.
CPC .............. *G10L 17/24* (2013.01); *B60R 25/25* (2013.01); *B60K 35/00* (2013.01)

(58) Field of Classification Search
CPC .......... G10L 17/24; B60R 25/25; B60K 35/00
See application file for complete search history.

(56) References Cited

U.S. PATENT DOCUMENTS

| 2002/0080942 A1* | 6/2002 | Clapper ................ H04M 1/575 379/201.01 |
| 2010/0241857 A1* | 9/2010 | Okude .................. H04L 9/3226 713/168 |
| 2013/0166399 A1* | 6/2013 | Awad .................. G06Q 20/3278 705/16 |
| 2015/0149042 A1* | 5/2015 | Cooper ................... H04W 4/48 701/48 |
| 2015/0339334 A1 | 11/2015 | Hanke |
| 2018/0009416 A1* | 1/2018 | Maiwand ........... G07C 9/00571 |
| 2019/0366978 A1 | 12/2019 | Woo et al. |

FOREIGN PATENT DOCUMENTS

| DE | 10 2012 012 565 A1 | 12/2013 |
| EP | 3 239 935 A1 | 11/2017 |
| JP | 2010-086328 A | 4/2010 |
| WO | 2018/093060 A1 | 5/2018 |

* cited by examiner

*Primary Examiner* — Thomas D Alunkal
(74) *Attorney, Agent, or Firm* — Oliff PLC

(57) ABSTRACT

A vehicle authentication device includes an electronic control unit. The electronic control unit is configured to display predetermined verification information on a display device, receive, via an information processor possessed by a user, information on an operation performed by the user after the verification information is displayed, and determine that the information processor is present inside a vehicle cabin, when the information on the operation has a predetermined correspondence with the verification information.

10 Claims, 4 Drawing Sheets

VEHICLE AUTHENTICATION DEVICE AND VEHICLE CONTROL SYSTEM

INCORPORATION BY REFERENCE

The disclosure of Japanese Patent Application No. 2018-114274 filed on Jun. 15, 2018 including the specification, drawings and abstract is incorporated herein by reference in its entirety.

BACKGROUND

1. Technical Field

The disclosure relates to an authentication device provided in a vehicle and configured to authenticate an information processor possessed by a user, and a vehicle control system including the authentication device and the information processor.

2. Description of Related Art

There has been proposed a so-called smart system in which, when a user who possesses an electronic key or the like authenticated via wireless communications with a vehicle performs a predetermined operation of pressing down a start-stop switch in a vehicle cabin, for example, a vehicle operation such as engine starting or power supply staring is controllable.

In the meantime, as a technology to authenticate a user, an ear biometrics technology using a mobile phone device is proposed by Japanese Unexamined Patent Application Publication No. 2010-086328 (JP 2010-086328 A). In the ear biometrics technology, a reference sound is emitted to the ear canal of the user from the mobile phone device put on the ear of the user, and the echo of the reference sound reflected and returned from the tympanic membrane is collected by the mobile phone device, so that the user can be authenticated based on the feature of the echo thus collected.

Accordingly, it is conceivable that an authentication process between a user and a vehicle is performed by use of an information processor having such an ear biometrics function instead of an electronic key for a smart system.

SUMMARY

The operation such as engine starting or power supply staring in a vehicle is permitted only at the time when an electronic key or the like authenticated by the vehicle is present inside the vehicle, except a special operation such as a remote engine starter. On this account, in a case where such a vehicle operation is requested from a user, it is necessary, in a vehicle control system, to determine whether the electronic key or the like is present inside the vehicle cabin or not, when the vehicle authenticates the electronic key or the like.

Here, the information processor having the ear biometrics function as described above may be equipped with a telecommunications standard communicable in a wider range than an electronic key for exclusive use of a vehicle. On this account, in a case where the information processor equipped with a telecommunications standard with a wide communication range is used instead of the electronic key for exclusive use of the vehicle, even if the information processor is provided outside the vehicle, the communication is performable, and therefore, it is hard to accurately determine whether or not the information processor is present inside the vehicle cabin, differently from the electronic key.

The disclosure provides a vehicle authentication device and a vehicle control system each of which can accurately determine whether or not an information processor is present inside a vehicle cabin, regardless of a telecommunications standard provided in the information processor.

A vehicle authentication device according to a first aspect of the disclosure is provided in a vehicle and includes an electronic control unit. The electronic control unit is configured to display predetermined verification information on a display device provided in the vehicle at a predetermined timing such that the verification information is visible to a user inside a vehicle cabin. The electronic control unit is configured to receive, via an information processor possessed by the user, information on an operation performed by the user after the verification information is displayed. The electronic control unit is configured to determine that the information processor is present inside the vehicle cabin, when the information on the operation has a predetermined correspondence with the verification information.

In the aspect, the predetermined verification information is displayed on the display device in a form recognizable by an occupant inside the vehicle cabin at the timing when the user gets in the vehicle, and the information on the operation performed by the user after the verification information is displayed is received via the information processor. Hereby, when the information on the operation performed by the user, received via the information processor possessed by the user, has a predetermined correspondence with the verification information, it can be determined that the user is present inside the vehicle cabin. Accordingly, it can be also determined that the information processor possessed by the user determined to be present inside the vehicle cabin is also present inside the vehicle cabin.

Further, in the above aspect, the verification information may be a digit string or a text string. The electronic control unit may be configured to receive, via the information processor, utterance information on an utterance made by the user as the information on the operation. The electronic control unit may be configured to determine that the information processor is present inside the vehicle cabin, when the utterance information matches the verification information.

In this aspect, a digit string or a text string is used as the verification information, and the utterance information on the utterance made by the user is acquired via the information processor. Hereby, just by verifying whether the digit string or the text string matches the utterance information or not, it can be easily determined whether the information processor possessed by the user is present inside the vehicle cabin or not.

Further, in the above aspect, the electronic control unit may be configured to display the verification information at a position on the display device at which the verification information is visible to the user sitting on a driver seat.

In this aspect, only the user who sits on the driver seat can know the verification information. Hereby, based on whether or not the information on the operation performed by the user has a predetermined correspondence with the verification information, it can be determined whether or not the information processor possessed by the user is present near the driver seat inside the vehicle cabin.

Further, in the above aspect, when the electronic control unit determines that the information processor is present inside the vehicle cabin, an engine or a power supply of the vehicle may be started.

In this aspect, the engine or the power supply of the vehicle is started promptly based on the determination that the information processor possessed by the user is present inside the vehicle cabin. This shortens the time to engine starting or power supply starting after the user gets in the vehicle, so that convenience for the user improves.

Further, in the above aspect, the electronic control unit may be configured to display the verification information on the display device at random for each timing.

In this aspect, the verification information to be displayed on the display device is changed at random for each timing. Hereby, even if the user performs, outside the vehicle cabin, an operation corresponding to verification information memorized previously, for example, information on the operation does not match current verification information. Accordingly, it is not wrongly determined that the information processor is present inside the vehicle cabin. This makes it possible to accurately determine whether or not the information processor is present inside the vehicle cabin.

Further, in the above aspect, the timing may be a point of time when a series of operations of unlocking, opening, and closing of a door of the vehicle are completed.

In this aspect, the verification information is displayed on the display device after a series of operations based on which it can be estimated that the user has moved into the vehicle from the outside of the vehicle (the user has got into the vehicle) are detected. This makes it possible to accurately determine whether or not the information processor is present inside the vehicle cabin.

Further, in the above aspect, the information processor may be a device configured to be put on the earhole of the user and to authenticate the user based on the property of echo in the earhole.

Like this aspect, when a device that can highly accurately authenticate the user wearing the device is used as the information processor, it is possible to achieve securer authentication.

Further, in the above aspect, the electronic control unit may be configured to display the verification information on the display device with luminance lower than luminance of other pieces of information.

Like this aspect, when the verification information is displayed with luminance lower than luminance of other pieces of information, the user can easily recognize that the information thus displayed is the verification information, and further, the verification information can be hardly visible from the outside of the vehicle cabin.

A vehicle control system according to a second aspect of the disclosure includes an information processor possessed by a user, and an authentication device provided in a vehicle and configured to authenticate the information processor. The information processor includes an information acquisition portion configured to acquire information on an operation performed by the user, and a transmission portion configured to transmit the information on the operation to the authentication device, the information being acquired by the information acquisition portion. The authentication device includes an electronic control unit configured to display predetermined verification information on a display device provided in the vehicle at a predetermined timing such that the verification information is visible to the user inside a vehicle cabin. The electronic control unit is configured to receive, via the information processor, the information on the operation performed by the user after the verification information is displayed. The electronic control unit is configured to determine that the information processor is present inside the vehicle cabin, when the information on the operation has a predetermined correspondence with the verification information.

In the above aspect, the predetermined verification information is displayed on the display device in a form recognizable by the occupant inside the vehicle cabin at the timing when the user gets in the vehicle, and the information on the operation performed by the user after the verification information is displayed is received via the information processor. Hereby, when the information on the operation performed by the user, received via the information processor possessed by the user, has a predetermined correspondence with the verification information, it can be determined that the user is present inside the vehicle cabin. Accordingly it can be also determined that the information processor possessed by the user determined to be present inside the vehicle cabin is also present inside the vehicle cabin.

With the vehicle authentication device and the vehicle control system in the above aspects, it is possible to accurately determine whether or not the information processor is present inside the vehicle cabin regardless of a provided telecommunications standard.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Outline

An authentication device of the disclosure is configured to display, on a display, information such as a digit string in a form recognizable by an occupant inside a vehicle cabin at a timing when a user gets in a vehicle and is also configured to receive information acquired by an information processor possessed by the user, e.g., information such as a collected utterance made by the user. When the information received from the information processor has a predetermined correspondence with the information displayed on the display, the authentication device determines that the user and the information processor are present inside the vehicle cabin, but in other cases, the authentication device determines that the user and the information processor are not present inside the vehicle cabin.

Configuration

Vehicle Control System

Figure 1:
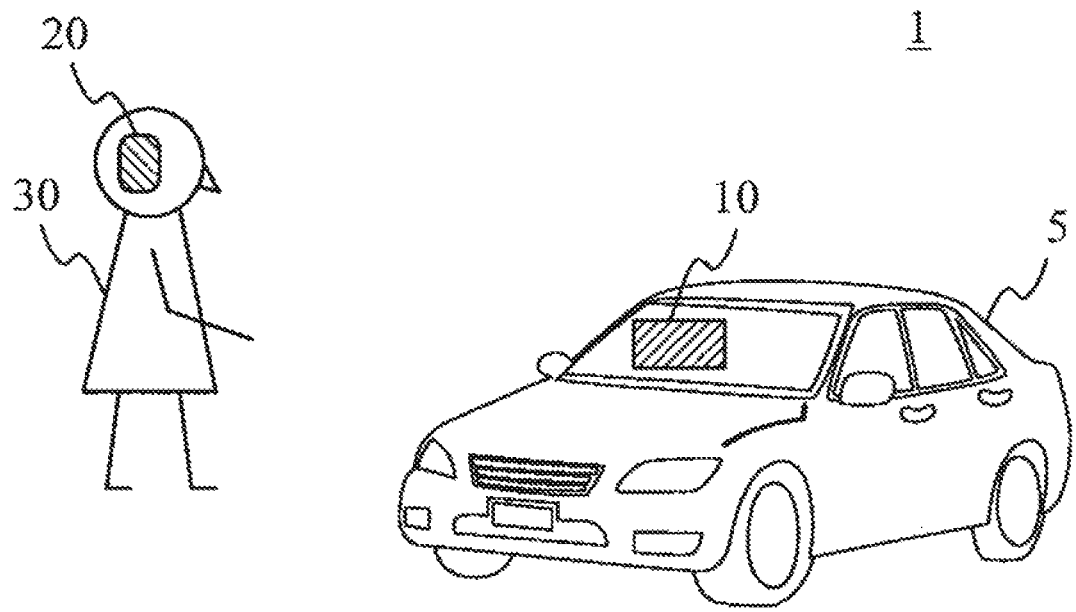
FIG. 1 is a view to describe the outline of a vehicle control system according to the present embodiment.

FIG. 1 is a view to describe the outline of a vehicle control system 1 according to one embodiment of the disclosure. The vehicle control system 1 illustrated in FIG. 1 is constituted by a vehicle authentication device 10 provided in a vehicle 5, and an information processor 20 possessed by a user 30 (put on or carried by the user 30).

In the vehicle control system 1, when the user 30 performs a vehicle operation such as engine starting (IG_ON) or turning-on of a power supply (Ready_ON), an authentication process of determining whether or not the information processor 20 is a rightful device that can operate the vehicle 5 is performed between the vehicle authentication device 10 and the information processor 20. Note that authentication between the vehicle authentication device 10 and the information processor 20 may be performed indirectly via a wireless communications apparatus (not shown) such as a smartphone, for example.

Further, in the vehicle control system 1, in order to perform the vehicle operation using the information processor 20 with a higher security than a vehicle operation using an electronic key for exclusive use of the vehicle, an authentication process of determining whether or not the user 30 possessing the information processor 20 is a person having an authority to operate the information processor 20 may be performed. This authentication process can use, for example, biometrics authentication such as ear biometrics or fingerprint authentication.

Further, in the vehicle control system 1, in order that the vehicle operation using the information processor 20 has a further higher security, the vehicle authentication device 10 of the vehicle 5 highly accurately determines the position of the information processor 20, more specifically, whether the information processor 20 is present inside the vehicle cabin or outside the vehicle cabin. The following describes a technique to highly accurately determine whether the information processor 20 is present inside the vehicle cabin or not.

Vehicle Authentication Device

Figure 2:
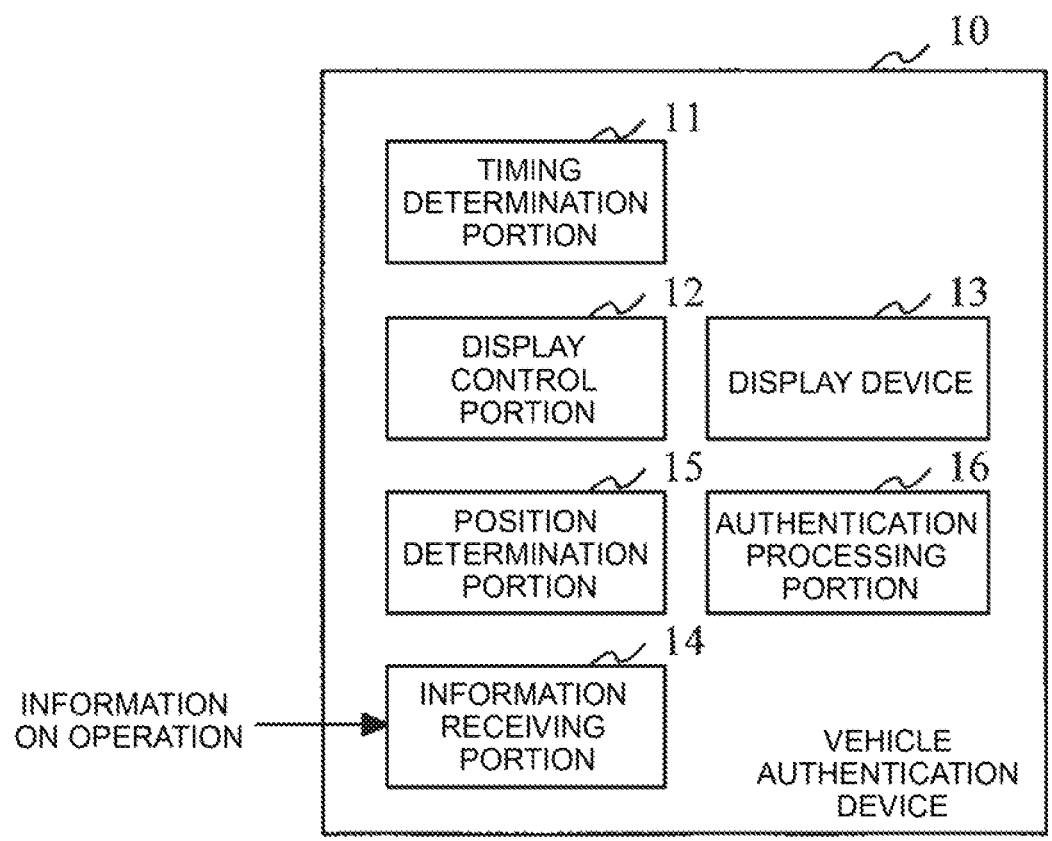
FIG. 2 is a view illustrating a detailed exemplary configuration of a vehicle authentication device.

FIG. 2 illustrates a detailed exemplary configuration of the vehicle authentication device 10 illustrated in FIG. 1. The vehicle authentication device 10 in FIG. 2 includes a timing determination portion 11, a display control portion 12, a display device 13, an information receiving portion 14, a position determination portion 15, and an authentication processing portion 16.

The timing determination portion 11 can determine a timing when verification information (described later) is displayed on the display device 13 via the display control portion 12. The timing should be set to a getting-in timing when it can be estimated that the user 30 has moved into the vehicle from the outside of the vehicle (the user 30 has got into the vehicle 5). As an example, the timing can be set to a point of time when a series of operations to get in the vehicle are completed, the series of operations including unlocking of a door of the vehicle 5, opening of the door, and closing of the door after that, for example. Alternatively, the timing can be set to a point of time when a sitting sensor provided in a seat detects sitting. Each time when the timing determination portion 11 determines the timing, the timing determination portion 1I instructs the display control portion 12 to display verification information.

The display control portion 12 can generate predetermined verification information based on an instruction from the timing determination portion 11 and cause the display device 13 to display the verification information thus generated. The verification information is typically information to request the user 30 to make an utterance, and is, for example, numeral information (e.g., "45281"), character information (e.g., "ACGTS"), information in combination of the numeral information and the character information, or the like. The character information may be a word (e.g., "Airplane") having a meaning. Further, the verification information may be information (e.g., "head: left→right→up") to request the user 30 to make a gesture.

Each time when the display control portion 12 receives an instruction from the timing determination portion 11, the display control portion 12 generates verification information (a digit string using random numbers, a text string, or the like) at random. The display control portion 12 controls to display the verification information at a specific position on the display device 13. The specific position is a position visible to an occupant inside the vehicle cabin of the vehicle 5, more desirably, a position visible only to an occupant who sits on a driver seat. For example, the specific position can be set to a position of a meter panel that is covered with a hood and is not visible from the outside of the vehicle, or the like. Further, the display control portion 12 may control to display the verification information on the display device 13 in a specific form. The specific form can be such a form that the verification information has luminance lower than that of other pieces of information so that the verification information is distinguished from the other pieces of information. The decrease amount of the luminance can be determined in accordance with brightness around the display device 13.

The display device 13 is a display on which the verification information generated by the display control portion 12 can be displayed. As the display device 13, a multi-information display (MID), a head up display (HUD), a center display, and the like can be used.

The information receiving portion 14 can receive information on an operation performed by the user 30 from the information processor 20. In the present embodiment, the information on the operation, received by the information receiving portion 14 after the verification information is displayed on the display device 13, is focused on. The information on the operation is, for example, information (utterance information) on an utterance made by the user 30, information (gesture information) on a gesture made by the user 30, and the like.

The position determination portion 15 can determine whether the information processor 20 is present inside the vehicle cabin or not, based on the information on the operation, received by the information receiving portion 14, and the verification information displayed on the display device 13 by the display control portion 12. More specifically, when the information on the operation has a predetermined correspondence with the verification information, the position determination portion 15 determines that the information processor 20 is present inside the vehicle cabin. The reason is as follows. As described above, the verification information is displayed at a position visible to the occupant inside the vehicle cabin. Accordingly, when the information on the operation corresponding to the verification information can be received from the information processor 20, it can be estimated that the user 30 who has transmitted the information on the operation via the information processor 20 possessed by the user 30 is present inside the vehicle cabin.

In the determination by the position determination portion 15, in a case where the verification information is a digit string, for example, when utterance information (a sequence of numbers read aloud) from the user 30 matches the digit string, it is determined that the information processor 20 is present inside the vehicle cabin of the vehicle 5. In a case where the verification information is a digit string or a text string, the position determination portion 15 can easily determine whether the information processor 20 possessed by the user 30 is present inside the vehicle cabin or not, just by verifying whether the digit string or the text string matches the utterance information from the user 30 or not. Note that, when the information on the operation has a predetermined similarity with the verification information, the position determination portion 15 may determine that the information processor 20 is present inside the vehicle cabin of the vehicle 5.

Here, in a case where the verification information is generated by the display control portion 12 at random, even if the user performs, outside the vehicle cabin, an operation corresponding to verification information memorized at the time when the user gets in the vehicle previously, information on the operation does not match current verification information. Hereby, it is possible to prevent the position determination portion 15 from wrongly determining that the information processor is present inside the vehicle cabin, thereby making it possible to improve accuracy of the determination. Further, when the verification information is displayed by the display control portion 12 with luminance lower than that of other pieces of information, the user 30 can easily recognize that displayed information is the verification information, and further, the identification information can be hardly visible from the outside of the vehicle cabin. Hereby, the accuracy of the determination, by the position determination portion 15, on whether or not the information processor 20 is present inside the vehicle cabin or not can be improved.

The authentication processing portion 16 can execute a predetermined authentication process on the information processor 20 only when the position determination portion 15 determines that the information processor 20 is present inside the vehicle cabin of the vehicle 5. The predetermined authentication process is executed in response to a request of an operation (except a request of a special operation such as a remote engine starter) such as engine starting or power supply staring of the vehicle 5 that is permitted only at the time when the information processor 20 is present inside the vehicle cabin. Note that, in a case where the verification information is displayed at the position visible only to the occupant sitting on the driver seat by the display control portion 12 and the position determination portion 15 determines that the information processor 20 is present inside the vehicle cabin, it can be estimated that the user 30 wants to drive the vehicle 5. At this time, the engine or the power supply of the vehicle 5 may be started promptly based on the determination that the information processor 20 is present inside the vehicle cabin. This shortens the time to engine starting or power supply starting after the user gets in the vehicle, so that convenience for the user improves.

Note that, at a point of time when the position determination portion 15 determines, based on an utterance or a gesture made by the user 30, that the information processor 20 is present inside the vehicle cabin of the vehicle 5, the engine or the power supply may be started promptly without operating a switch for engine starting or power supply starting, the switch being provided in an instrument panel or the like of the vehicle 5, for example. In such a scene, it can be determined that the user 30 has an intention of starting the engine or the power supply, and when a starting operation is performed smoothly, it is possible to improve the convenience for the user 30.

Note that some or all of the constituents such as the timing determination portion 11, the display control portion 12, the information receiving portion 14, the position determination portion 15, and the authentication processing portion 16 can be typically constituted by an electronic control unit (ECU) including a processor, a memory, an input-output interface, and so on. In the electronic control unit, the processor reads out and executes a predetermined program stored in the memory, so that a function of each of the constituents is implemented.

Information Processor

Figure 3:
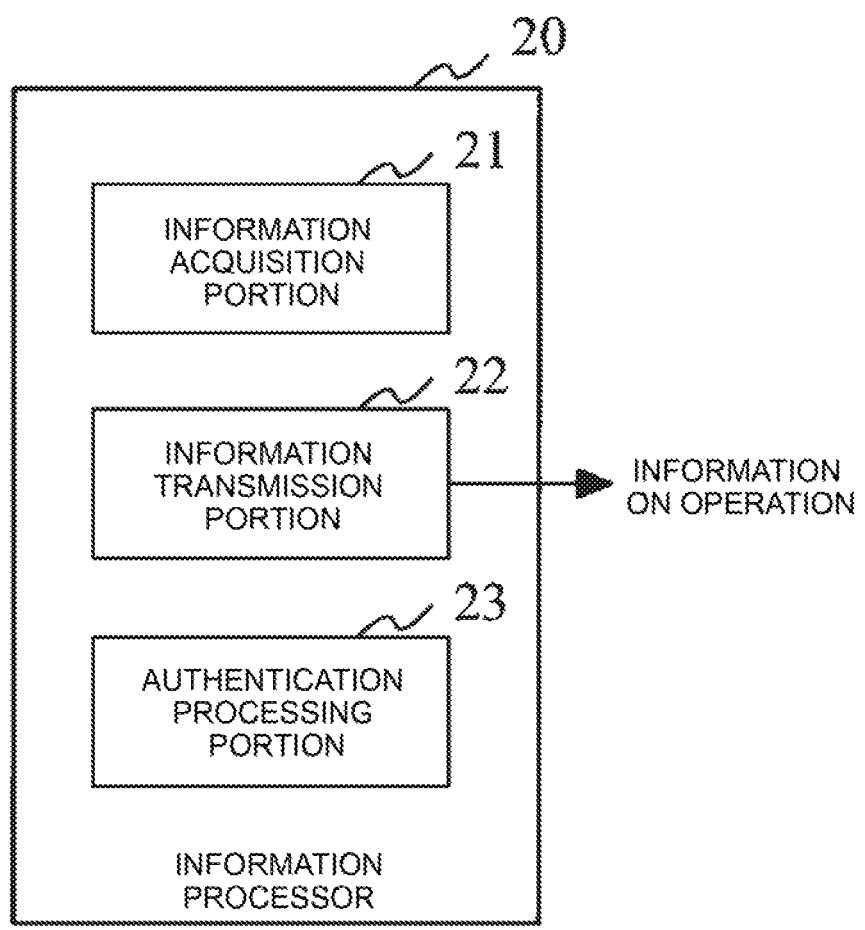
FIG. 3 is a view illustrating a detailed exemplary configuration of an information processor.

FIG. 3 illustrates a detailed exemplary configuration of the information processor 20 illustrated in FIG. 1. The information processor 20 of FIG. 3 includes an information acquisition portion 21, an information transmission portion 22, and an authentication processing portion 23.

The information acquisition portion 21 can acquire information on an operation performed by the user 30. Typically, the information acquisition portion 21 acquires the information on the operation performed by the user 30 in accordance with verification information after the verification information is displayed on the display device 13 of the vehicle authentication device 10. As the information acquisition portion 21, a microphone that can catch and collect sound around the information processor 20, an acceleration sensor that can detect the motion of the information processor 20, and the like can be used, for example. Utterance information from the user 30 can be acquired by the microphone, and gesture information in accordance with the motion of the information processor 20 can be acquired by the acceleration sensor.

The information transmission portion 22 can transmit, to the vehicle authentication device 10, the information on the operation performed by the user 30, acquired by the information acquisition portion 21. The transmission is also performable by use of a telecommunications standard such as Bluetooth (registered trademark), for example, provided in the vehicle 5 as well as the information processor 20.

The authentication processing portion 23 can execute a predetermined authentication process on the user 30. For example, in a case where the information processor 20 is a device put on the earhole of the user 30, the authentication processing portion performs ear biometrics in which a sound is emitted to the tympanic membrane and an individual is specified based on the frequency characteristic of a sound reflected from the tympanic membrane. Further, in a case where the information processor 20 is a device put on the wrist of the user, the authentication processing portion performs fingerprint authentication or the like via a sensor provided on a board surface. Note that the authentication processing portion 23 may not be provided in the information processor 20.

Control

Figure 4:
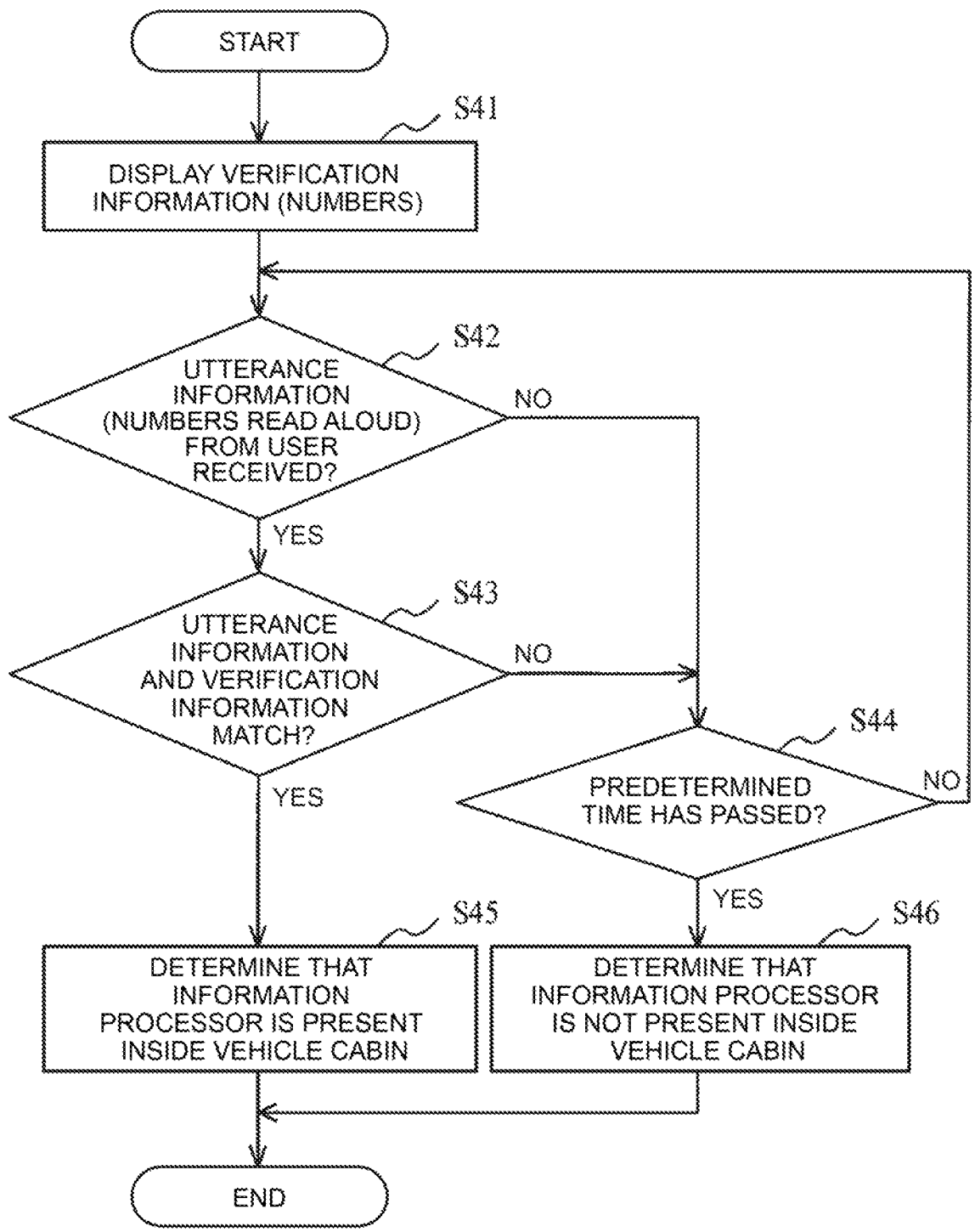
FIG. 4 is a flowchart illustrating the procedure of a position determination process performed by the vehicle authentication device.
Figure 5:
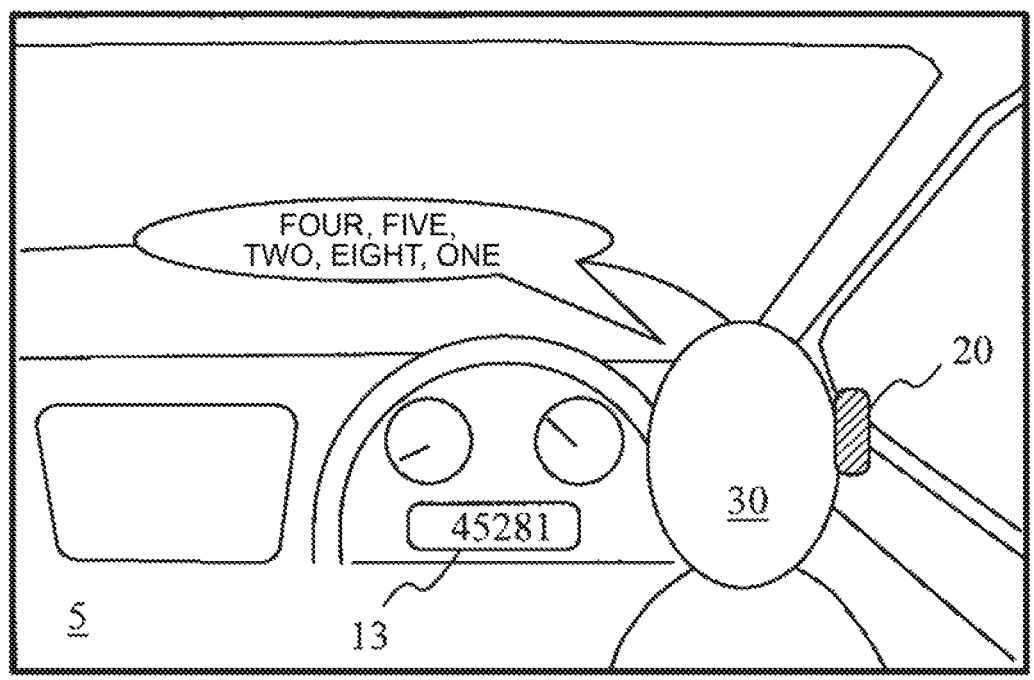
FIG. 5 illustrates an example of a state where a user wearing the information processor makes an utterance in accordance with verification information displayed on a display device.

With reference to FIGS. 4 and 5, the following describes a control executed by the vehicle control system 1. FIG. 4 is a flowchart illustrating the procedure of a position determination process performed by the vehicle authentication device 10 of the present embodiment. FIG. 5 is a view to describe an example of a state where the user 30 who sits on the driver seat and wears the information processor 20 makes an utterance in accordance with verification information displayed on the display device 13. Note that the following description deals with a case where numeral information is used as the verification information.

The position determination process illustrated in FIG. 4 is started when the timing determination portion 11 determines a timing when the verification information is displayed on the display device 13 via the display control portion 12.

Step S41: the display control portion 12 displays the verification information on the display device 13. The display of the verification information may be performed only for a given period of time set in advance or may be performed until a determination is made in step S45 or S46 described below. In the example of FIG. 5, a digit string "45281" as the verification information is displayed on the display device 13 provided in the meter panel of the vehicle 5.

Step S42: it is determined whether or not the information receiving portion 14 has received information (utterance information) on an utterance made by the user 30 from the information processor 20. In the example of FIG. 5, the utterance "four, five, two, eight, one" made by the user 30 in response to the displayed digit string "45281" is received as the utterance information. When the utterance information has been received (S42, Yes), the process proceeds to step S43, and when the utterance information has not been received (S42, No), the process proceeds to step S44.

Step S43: the position determination portion 15 determines whether or not the utterance information thus acquired matches the verification information displayed on the display device 13 by the display control portion 12. In the example of FIG. 5, the verification information "45281" matches the utterance information "four, five, two, eight, one." When both pieces of information match (S43, Yes), the process proceeds to step S45, but when both pieces of information do not match (S43, No), the process proceeds to step S44.

Step S44: the position determination portion 15 determines whether or not a predetermined time has passed in a state where the utterance information has not been acquired or in a state where the acquired utterance information does not match the verification information after the verification information is displayed on the display device 13. When the predetermined time has passed (S44, Yes), the process proceeds to step S46, but when the predetermined time has not passed (S44, No), the process returns to step S42.

Step S45: the position determination portion 15 determines that the information processor 20 is present inside the vehicle cabin of the vehicle 5. Based on this determination, the display control portion 12 may finish the display of the verification information on the display device 13. Further, when a specific vehicle operation such as engine starting or power supply staring is performed by the user 30, the authentication processing portion 16 permits execution of the authentication process based on this determination. Alternatively, based on this determination, the authentication processing portion 16 may start the specific vehicle operation such as engine starting or power supply staring promptly without waiting for the operation to be performed by the user 30. Hereby, a position determination control is finished.

Step S46: the position determination portion 15 determines that the information processor 20 is not present inside the vehicle cabin of the vehicle 5. Based on this determination, the display control portion 12 may finish the display of the verification information on the display device 13. Hereby, the position determination control is finished.

Operations and Effects

In the vehicle control system 1 according to one embodiment of the disclosure, the vehicle authentication device 10 displays verification information on the display device 13 in a form recognizable by the occupant inside the vehicle cabin at the timing when the user gets in the vehicle, and receives, via the information processor 20, information on an operation performed by the user 30 after the verification information is displayed.

Hereby, when the information on the operation performed by the user 30, the information being received via the information processor 20 possessed by the user 30, has a predetermined correspondence with the verification information displayed inside the vehicle cabin, the vehicle authentication device 10 can determine that the user 30 is present inside the vehicle cabin. Accordingly, it can be also determined that the information processor 20 possessed by the user 30 determined to be present inside the vehicle cabin is also present inside the vehicle cabin.

The vehicle control system of the disclosure is usable in a case where a vehicle operation is performed by authentication with a vehicle by use of an information processor (except an electronic key for exclusive use of the vehicle) possessed by a user.

What is claimed is:

1. A vehicle authentication device provided in a vehicle, the vehicle authentication device comprising:
an electronic control unit configured to display predetermined verification information on a display device provided in the vehicle at a predetermined timing such that the verification information is visible to a user inside a vehicle cabin,
the electronic control unit being configured to receive, via an information processor possessed by the user, information on an operation performed by the user after the verification information is displayed,
the electronic control unit being configured to determine whether the information on the operation has a predetermined correspondence with the verification information,
wherein, when the electronic control unit determines that the information on the operation has the predetermined correspondence with the verification information, the electronic control unit starts an engine or a power supply of the vehicle, and
when the electronic control unit determines that the information on the operation does not have the predetermined correspondence with the verification information, the electronic control unit does not start the engine or the power supply of the vehicle.

2. The vehicle authentication device according to claim 1, wherein:
the verification information is a digit string or a text string;
the electronic control unit is configured to receive, via the information processor, utterance information on an utterance made by the user as the information on the operation; and
the electronic control unit is configured to determine that the information processor is present inside the vehicle cabin, when the utterance information matches the verification information.

3. The vehicle authentication device according to claim 1, wherein the electronic control unit is configured to display the verification information at a position on the display device at which the verification information is visible to the user sitting on a driver seat.

4. The vehicle authentication device according to claim 1, wherein the electronic control unit is configured to display the verification information on the display device at random for each timing.

5. The vehicle authentication device according to claim 1, wherein the timing is a point of time when a series of operations of unlocking, opening, and closing of a door of the vehicle are completed.

6. The vehicle authentication device according to claim 1, wherein the information processor is a device configured to be put on an earhole of the user and to authenticate the user based on a property of echo in the earhole.

7. The vehicle authentication device according to claim 1, wherein the electronic control unit is configured to display the verification information on the display device with luminance lower than luminance of other pieces of information.

8. A vehicle control system comprising:
an information processor possessed by a user; and
an authentication device provided in a vehicle and configured to authenticate the information processor, wherein:
the information processor includes an information acquisition portion configured to acquire information on an operation performed by the user, and a transmission portion configured to transmit the information on the operation to the authentication device, the information being acquired by the information acquisition portion;
the authentication device includes an electronic control unit configured to
display predetermined verification information on a display device provided in the vehicle at a predetermined timing such that the verification information is visible to the user inside a vehicle cabin,
receive, via the information processor, the information on the operation performed by the user after the verification information is displayed, and
determine whether the information on the operation has a predetermined correspondence with the verification information,
wherein, when the electronic control unit determines that the information on the operation has the predetermined correspondence with the verification information, the electronic control unit starts an engine or a power supply of the vehicle, and
when the electronic control unit determines that the information on the operation does not have the predetermined correspondence with the verification information, the electronic control unit does not start the engine or the power supply of the vehicle.

9. A method for controlling a vehicle comprising:
displaying predetermined verification information on a display device in the vehicle at a predetermined timing such that the verification information is visible to a user inside a cabin of the vehicle,
receiving, via an information processor of the vehicle, information on an operation performed by the user after the verification information is displayed,
determining, via an electronic control unit of the vehicle, whether the information on the operation has a predetermined correspondence with the verification information,
when the electronic control unit determines that the information on the operation has the predetermined correspondence with the verification information, starting an engine or a power supply of the vehicle, and
when the electronic control unit determines that the information on the operation does not have the predetermined correspondence with the verification information, not starting the engine or the power supply of the vehicle.

10. A non-transitory computer-readable medium having a program stored thereon, the program, when being executed by a computer on a vehicle, instructing the vehicles to perform functions comprising:
displaying predetermined verification information on a display device in the vehicle at a predetermined timing such that the verification information is visible to a user inside a cabin of the vehicle,
receiving, via an information processor of the vehicle, information on an operation performed by the user after the verification information is displayed,
determining, via an electronic control unit of the vehicle, whether the information on the operation has a predetermined correspondence with the verification information,
when the electronic control unit determines that the information on the operation has the predetermined correspondence with the verification information, starting an engine or a power supply of the vehicle, and
when the electronic control unit determines that the information on the operation does not have the predetermined correspondence with the verification information, not starting the engine or the power supply of the vehicle.

* * * * *